Inventor
George W. Collin
By Chamberlain & Newman
Attorneys

Witnesses

UNITED STATES PATENT OFFICE.

GEORGE W. COLLIN, OF BRIDGEPORT, CONNECTICUT.

ELECTRICALLY-OPERATED VALVE.

No. 926,389.　　　Specification of Letters Patent.　　　Patented June 29, 1909.

Application filed February 23, 1907. Serial No. 359,031.

*To all whom it may concern:*

Be it known that I, GEORGE W. COLLIN, citizen of the United States, and resident of Bridgeport, in the county of Fairfield and State of Connecticut, have invented certain new and useful Improvements in Electrically-Operated Valves, of which the following is a specification.

This invention relates to cut-off mechanism for valves, and its object is to provide pressure-operated electro-mechanical means whereby the valve may be maintained open until the pressure of the fluid to be controlled falls below a predetermined point.
Still another object is to provide a compound valve of peculiar construction adapted to be actuated under the conditions mentioned.

With these and other objects in view, the invention consists of certain novel details of construction and combination of parts which will be hereinafter more fully described and pointed out in the claims.

In the accompanying drawings is shown the preferred form of the invention.

Figure 1:
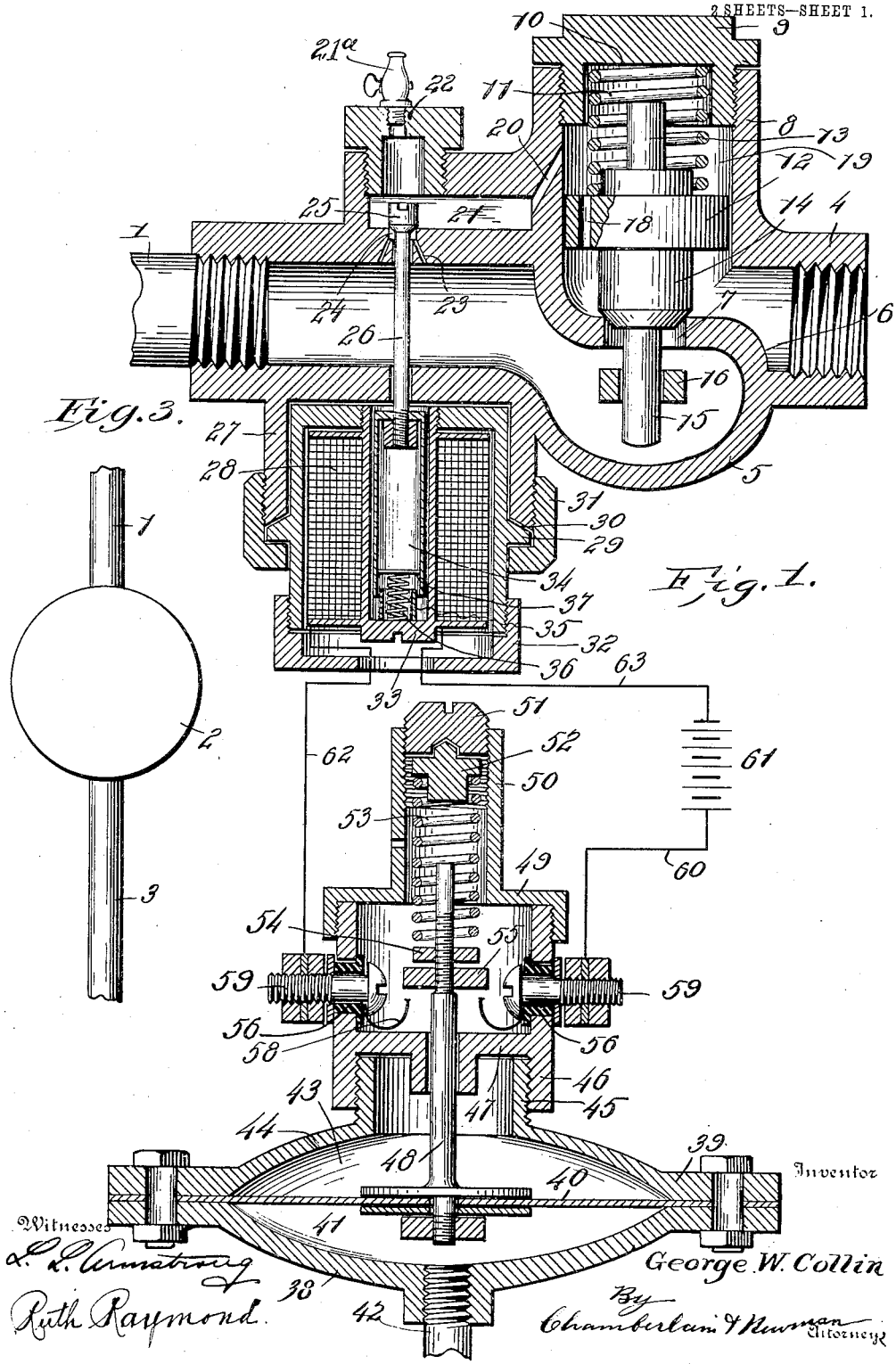
Figure 2:
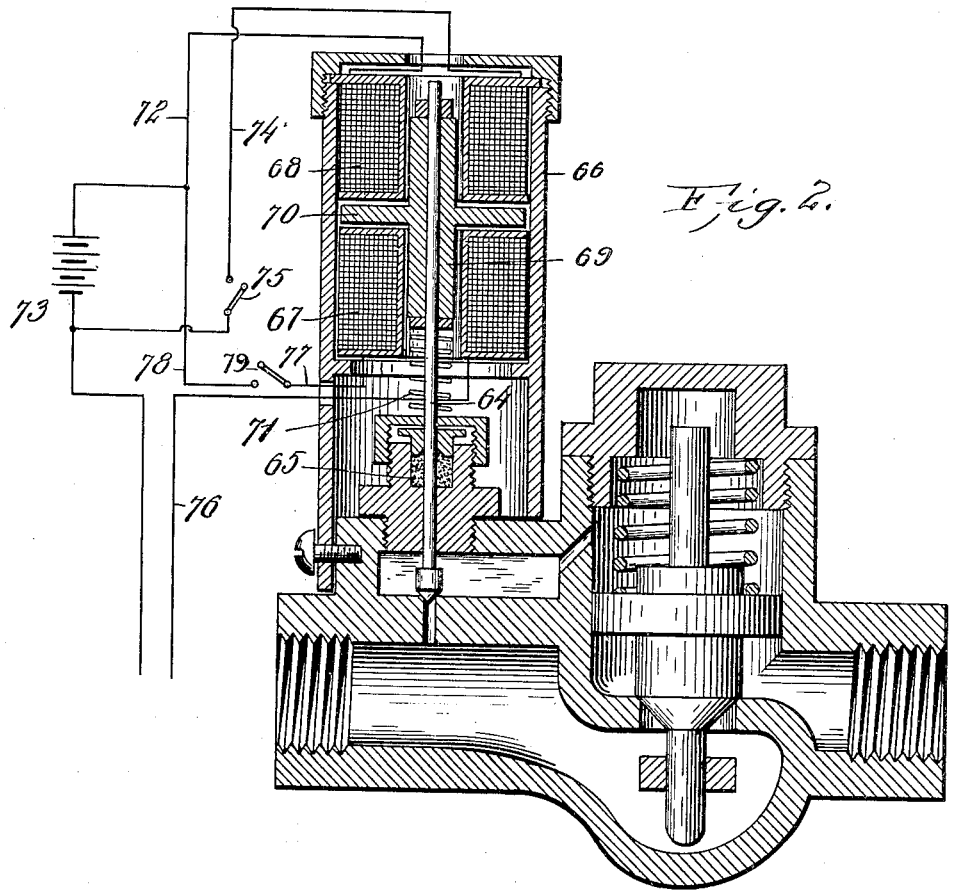

Figure 1 is a sectional view through the apparatus, the electrical and pipe connections being shown diagrammatically. Fig. 2 is a section through a modification. Fig. 3, is a plan view on a reduced scale of a gas pressure regulator with supply and feed pipes connected thereto.

The invention herein described is especially designed for use wherever it is desired to automatically cut off the supply of fluid under pressure whenever a break occurs or when from any other cause the pressure drops below a predetermined degree or if desired to manually operate said valve to open or close the same, and from a distant point, if necessary.

Referring to the drawings by characters of reference, 1 is the gas supply pipe extending to the pressure regulator 2, and from the regulator extends a pipe 3 for conducting gas to the point of use or distribution. Pipe 1 is intercepted by and opens into a valve casing 4 having a central enlargement 5 above which is disposed a partition 6 having a valve seat 7 in the horizontal or intermediate portion thereof. A tubular extension 8 is disposed above the partition and closed at its upper end by a cap 9 screwed thereinto. This cap has a recess 10 in which is seated one end of a spring 11 which bears on a piston 12 fitting snugly within extension 8. A stem 13 projects upward from the piston and serves to center the spring, and a valve 14 extends downward from the piston and is normally disposed upon the seat 7. A stem 15 depends from the valve and through seat 7 and is guided in a cross strip 16. A small aperture 18 is formed in the piston to permit gas to pass into the compartment 19 formed above the piston. This compartment communicates through a passage 20 with a secondary compartment 21 formed above the casing 4 and closed by a screw cap 22, but provided with a relief cock 21ª to use in opening the valve. A plurality of diverging passages 23 connect the compartment 21 with the interior of casing 4, said passages opening into a valve seat 24 which is closed by a valve 25. The stem 26 of this valve extends down through casing 4 and into a depending cylindrical casing 27 formed with the casing 4. The passages 18, 20 and 23 and compartments 19 and 21 constitute a by-pass from the inlet to the outlet ends of casing 4.

Within the casing 27 is housed a solenoid magnet 28, the jacket 29 of which has an outstanding annular flange 30 which is supported by a collar 31 screwed upon the casing 27. A cap 32 is screwed upon the lower end of the jacket 29. The lower end of stem 26 projects into the core 33 of the solenoid and is secured to a shell 34 loosely mounted in said core. A tube 35 is supported within the core at the lower end thereof and houses a spring 36 which pushes upward upon a cross-pin 37 in shell 34 and serves to hold valve 25 normally unseated when valve is open.

The operation of the valve herein described is as follows: Gas or other fluid under pressure is admitted to the casing 4 above partition 6 and pushes upward on piston 12 and lifts the valve 14 against the tension of spring 11. The gas will flow through the seat 7 and on through casing 4 and pipe 1. A portion of the gas will pass through the passage 18 in the piston and into compartment 19 from which it will flow through passage 20 and compartment 21 to casing 4 by way of the passages 23. Whenever the valve 25 is for any reason closed, however, this gas in compartments 19 and 21 will be trapped and will exert a downward pressure on the piston 12 and, therefore, cause it to be seated and cut off the flow through the casing 4.

The solenoid 28 is used to close the valve at proper times, there being mechanism for establishing a circuit therethrough whenever pressure in the system falls or electric contact is manually made. This mechanism consists of a casing made up of oppositely-disposed concavo-convex members 38 and 39 secured together, and the compartment formed thereby is sub-divided by a diaphragm 40. The lower division 41 of the compartment communicates with service pipe 3 through a tubular connection 42, and the upper division 43 has an air vent 44. A threaded extension 45 is formed on the member 39, and secured thereon is a sleeve 46 having a partition 47 in which is guided a stem 48 secured to and extending upward from the diaphragm. Sleeve 46 is closed at its upper end by a cap 49 having a tubular extension 50. A screw plug 51 closes this extension and constitutes a bearing for a block 52 seated in one end of a coiled spring 53. The other end of this spring bears on a nut 54 carried by stem 48, and a circuit closer 55 in the form of a nut or washer is also carried by the stem. Sleeves 56 of insulating material are secured in opposite portions of sleeve 46, and resilient bowed contact strips 58 are secured upon the inner ends of these sleeves 56 by screws 59 constituting binding posts. In practice the circuit closer 55 is normally disconnected from the contacts 58 and so held against the action of spring 53 by the fluid pressure, but when pressure is lost under diaphragm 40 the circuit closer 55 engages contacts 58 to close circuit. A wire 60 extends from a source 61, of electricity to one binding post, and another wire 62 connects the other binding post, with the solenoid, while a wire 63 which extends from the solenoid to the source of electricity completes the electrical circuit. The gas air, steam or water, etc. under pressure within pipes 1 and 3 presses the diaphragm 40 upward and forces the stem 48 against the tension of spring 53. The circuit closer 55 is therefore normally lifted from contacts 58 and the deenergized magnet permits spring 36 to unseat valve 25. Should a pipe break or the pressure of fluid be reduced in any other way, the spring 53 will force the circuit closer 55 downward upon contacts 58, and a circuit will be promptly established through the solenoid. Valve 25 will therefore close and the gas supply will be cut off in the manner hereinbefore stated. When the valve is once closed automatically as above outlined and with pressure thereagainst, it can only be opened by first relieving such pressure from chamber 21 through the relief cock 21ᵃ which allows both the main valve 14 to open by pressure under piston and valve 25 to open by action of spring 36.

Instead of constructing the device, as shown in Fig. 1, it may be formed as in Fig. 2. In this modified construction the stem 64 of the auxiliary valve extends upward through a gland 65 and a casing 66 which is secured upon the valve casing and contains two oppositely-disposed solenoid magnets 67 and 68 arranged one above the other. The armature 69 is secured on the stem 64 and is common to both magnets, and a flange 70 surrounds the armature and projects between the magnets. A spring 71 bears upward upon the armature so as to hold the valve normally open. A wire 72 extends from the magnet 68 to a source 73, of electricity, and a return wire 74 having a switch 75 connects said source and magnet. The magnet 67 is similarly connected with said source by wires 76, 77 and 78 through switch 79. The wires 76 lead to the pressure operated switch hereinbefore described.

The preferred form of the invention has been set forth by me but I do not limit myself thereto as I am aware that modifications may be made therein without departing from the spirit or sacrificing the advantages thereof.

What I claim is:—

1. The combination with a casing having an inlet and an outlet, of a valve for closing communication through the casing, a piston carried thereon permitting a passage of fluid therepast, a supplemental valve, electrically operated means for seating the supplemental valve to stop the flow to seat the main valve.

2. The combination with a casing having an inlet and an outlet; of a valve for closing communication through the casing, a piston carried thereby permitting a passage of fluid therepast, and a by-pass for conveying such fluid through the casing, and pressure-controlled electrically operated means for closing the by-pass.

3. The combination with a casing; of a main valve for closing communication therethrough, pressure-operated means for opening the valve, said means permitting a passage of fluid therepast, passages for conducting fluid through the casing, and pressure-controlled electrically operated means for closing the main valve to stop the flow of fluid through the valve.

4. The combination with a casing; of a spring-pressed main valve for closing communication therethrough, a piston carried by the valve and operated by pressure to open the valve, said piston permitting the passage of fluid therepast, passages for conducting such fluid through the casing, and pressure controlled electrically-operated means for closing the main valve to stop the flow of fluid through the valve.

5. The combination with a casing; of a main valve for closing communication therethrough, pressure-operated means for opening the said valve, said means permitting a passage of fluid therepast, passages for conducting said fluid through the casing, a supplemental valve for stopping the flow of fluid therethrough to seat the first mentioned valve, and electrically operated means for seating the supplemental valve.

6. The combination with a casing; of a main valve for closing communication therethrough, pressure-operated means for opening the valve, said means permitting a passage of fluid therepast, means for conducting such fluid through the casing, a supplemental valve, electrically operated means for seating the supplemental valve to stop the flow of fluid to seat the main valve, and a pressure-operated circuit closer for said means.

7. The combination with a casing; of a main valve for closing communication therethrough, pressure-operated means for opening the valve, said means permitting a passage of fluid therepast, passages for conducting said fluid through the casing, a supplemental valve, electrically operated means for seating the supplemental valve to stop the flow of fluid to seat the main valve, a spring-actuated circuit closer for said means, and pressure-operated means for breaking said circuit.

8. The combination with a casing; of a main valve for closing communication therethrough, pressure-operated means for opening the said valve, said means permitting a flow of fluid therepast, passages for conducting fluid through the casing, a supplemental valve, a solenoid magnet for closing the supplemental valve, a spring-actuated circuit closer for maintaining the solenoid magnet energized, and pressure-operated means for breaking said circuit.

9. The combination with a casing; of a main valve for closing communication therethrough, pressure-operated means for opening the said valve, said means permitting a flow of fluid therepast, passages for conducting fluid through the casing, a supplemental valve, a solenoid magnet adapted when energized, to seat said supplemental valve to stop the flow of fluid to seat the main valve, contacts included in a circuit with said solenoid magnet, a circuit closer to engage the contacts, and pressure-operated means for removing the closer from the contacts.

10. The combination with a casing; of a main valve for closing communication therethrough, pressure-operated means for opening the main valve, said means permitting a flow of fluid therepast, passages for conducting fluid through the casing, a spring supported supplemental valve, a circuit including a solenoid magnet adapted when energized, to seat said supplemental valve to stop the flow of fluid to seat the main valve, and pressure operated means for breaking the circuit.

11. The combination with a casing; of a main valve for closing communication therethrough, pressure-operated means for opening the valve, said means permitting a flow of fluid therepast, passages for conducting fluid through the casing, a spring supported supplemental valve, a circuit including a solenoid magnet adapted when energized, to seat said supplemental valve to stop the flow of fluid, to seat the main valve, a diaphragm, means for directing pressure thereagainst from the casing, and means carried by the diaphragm for breaking the circuit.

12. The combination with a casing; of a main valve for closing communication therethrough, pressure-operated means for opening the valve, said means permitting a flow of fluid therepast, passages for conducting fluid through the casing, a spring-supported supplemental valve, a circuit including a solenoid magnet adapted, when energized, to seat said valve to stop the flow of fluid to seat the main valve, a spring pressed diaphragm, means for directing pressure thereagainst from the casing, and a circuit closer carried by the diaphragm.

13. The combination with a casing; of a main valve for closing communication therethrough, pressure-operated means for opening the valve, said means permitting a flow of fluid therepast, passages for conducting fluid through the casing, a supplemental valve, solenoid magnets, an armature therefor connected to the valve, a source of electricity in circuit with the solenoid magnets, pressure-operated means for closing the circuit to one of the solenoid magnets to seat the supplemental valve, and means for closing the other circuit to unseat the supplemental valve.

Signed at Mansfield, in the county of Richland, and State of Ohio, this 26th day of December, A. D., 1906.

GEORGE W. COLLIN.

Witnesses:
L. W. OLSON,
P. J. KELLEY.